April 3, 1928.
J. H. PARSONS
1,664,829
VENTILATOR FOR VEHICLES
Filed Sept. 21, 1925
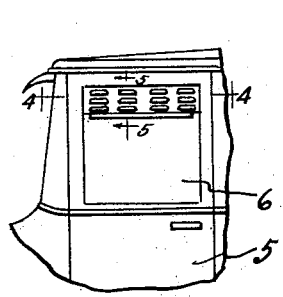
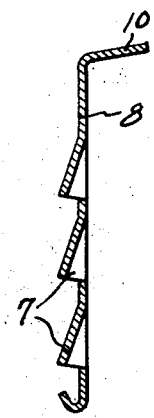
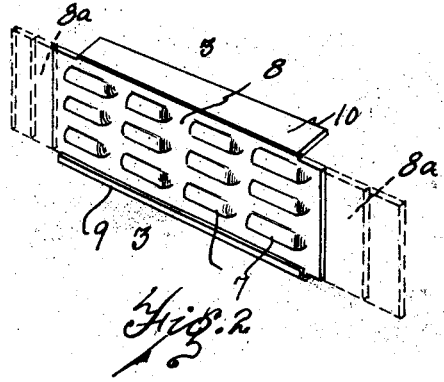
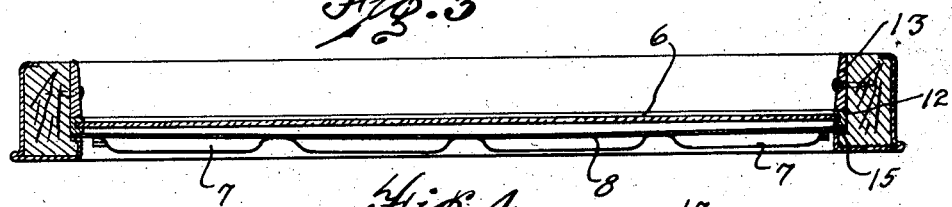
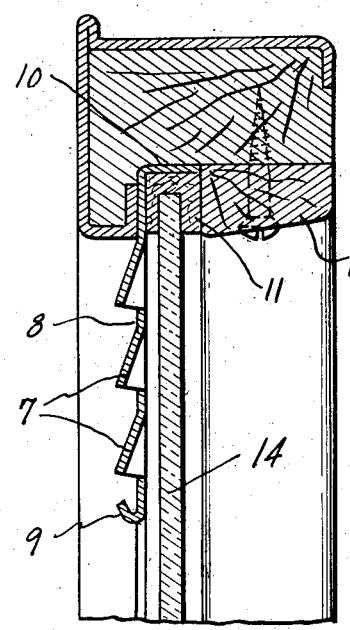
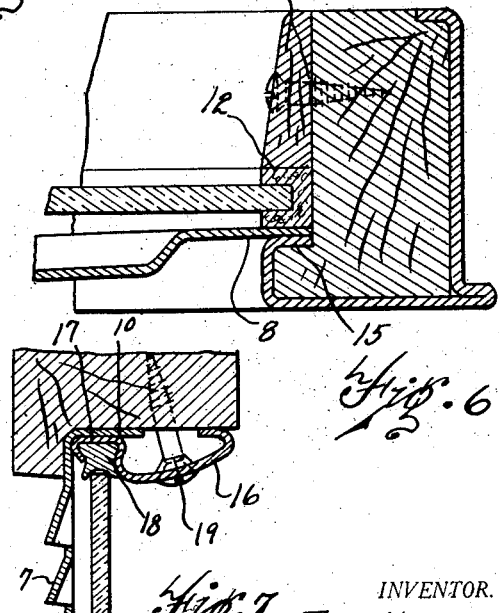
INVENTOR.
JOHN H. PARSONS
BY
Rex Frye
ATTORNEY.

Patented Apr. 3, 1928.

1,664,829

UNITED STATES PATENT OFFICE.

JOHN H. PARSONS, OF PONTIAC, MICHIGAN.

VENTILATOR FOR VEHICLES.

Application filed September 21, 1925. Serial No. 57,650.

This invention relates to ventilators for vehicles such as automobiles, motor boats and the like, and more particularly to those vehicles known as closed body vehicles.

The provision of a ventilator whereby a circulation of air through the car is permitted without draft upon the occupants and without interfering with the closing of the window at will is shown and claimed in my companion application, Serial No. 750,157, filed November 15, 1924. In the practice of this invention it has been found that the constant vibrations of the vehicle body due to swaying, jolting, sudden stops, etc. tend to set the ventilators into objectionable vibration, and cause rattling of the sides of the ventilator against the sides of the window frame. The principal object of the present invention is to provide a simple and effective means of overcoming such objectionable vibration and rattling.

Another object of my invention is the arrangement of a ventilator formed of flexible sheet metal or the like adapted to be distorted from its normal shape when positioned upon a vehicle body so that the sides are forced into engagement with the outer portions of the window frame and the central portion of the body of the ventilator is bowed outwardly from the window pane.

A further object of my invention is the provision of a sheet metal ventilator for vehicles having an inwardly extending flange at its upper extremity, which flange is normally bent at an angle to the remainder of the ventilator greater than ninety degrees, whereby, when the ventilator is positioned with the flange against the horizontal upper portion of a window frame, the causing of the flange of the ventilator to fit snugly against the upper portion of the window frame will tend to swing the remainder of the ventilator outwardly and into firm contact with the side portions of the window frame.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a detail side elevation of an automobile window equipped with my improved ventilator.

Fig. 2 is a perspective view of the ventilator before it is positioned.

Fig. 3 is a detail sectional view through the body portion of the ventilator.

Fig. 4 is an enlarged horizontal section taken substantially on the line 4—4 of Fig 1.

Fig. 5 is an enlarged vertical section taken substantially on the line 5—5 of Fig. 1.

Fig. 6 is a further enlarged horizontal sectional view showing in detail the position assumed by the ventilator at the side of the window frame, and Fig. 7 is a detail vertical section showing a different means of positioning my ventilator.

Referring now to the drawings, the numeral 5 designates an automobile of the closed body type having windows 6 mounted within the body and slidable within a fixed frame to any desired height. Ordinarily when one or more of the windows 6 of the car are lowered the inrush of air resulting forms a draft upon the occupants of the car, while if the windows are kept closed the interior of the vehicle becomes hot and stuffy. Particularly when one or more of the passengers are smoking, it soon becomes necessary for a window to be opened. My improved ventilator is arranged to permit the lowering of one or more of the windows 6 as desired without the objectionable draft resulting, inasmuch as the incoming air is directed upwardly toward the top of the car in small jets or currents.

My improved ventilator is herein shown integrally formed from sheet metal or the like with a plurality of spaced inlet openings 7 for admitting air to the interior of the car whenever the adjacent window 6 is partially lowered from the position shown in Fig. 5. These air inlets 7 are preferably formed by cutting the body portion 8 of the ventilator at predetermined intervals and then bending outwardly the material immediately above such cuts to substantially the positions shown. The ventilator may also be stiffened by the outward and upward bending of the lower edge of the body portion 8, and if desired the lower edge portion 9 may be arranged as a trough and slightly inclined toward one end of the body portion to aid in disposing of rain or moisture impinging against the ventilator, as when the vehicle is being driven in the rain. An inbent flange 10 is also formed at the top of the body portion 8, and such flange is utilized in the positioning of the ventilator within the window frame, as hereinafter described.

As best shown in Figs. 2 and 3 the flange 10 is not bent inwardly at right angles to the body portion 8 of the ventilator, but forms an angle with the body portion slightly greater than a right angle. This arrangement is utilized to insure an outward pressing of the body portion of the ventilator whenever the flange 10 is forced into engagement with a horizontal surface, as for example the top of the window frame. The sides of the window frame being ordinarily at right angles to the upper portion thereof prevents the outward inclination of the sides of the body portion, but the side portions of the ventilator always have a tendency to remain in contact with the side portions of the window frame and the strain due to positioning the ventilator into close engagement with the top and sides of the window frame results in a warping of the ventilator whereby the central portion bows outwardly away from the window pane, substantially as shown in Fig. 4. Accordingly, the inherent resiliency of the ventilator is utilized to maintain its side portions in snug engagment with the side portions of the window frame and maintain the central body portion in taut condition whereby it resists any tendency to vibrate independently of the car body when shocks or vibrations are imparted to the car body. To enable the ready bowing of the center of the body portion of the ventilator and maintain snug engagement between the side portions of the ventilator and the sides of the window frame, I preferably form the flange 10 at the top of the ventilator as well as the trough 9 of lesser strength than the ventilator body. As best shown in Fig. 2 the trough 9 and flange 10 have their extremities inwardly of the side portions of the body portion of the ventilator and the side portions 8ª of the ventilator are formed of sheet metal arranged in a substantially vertical plane. This construction also lends itself to the ready fitting of the ventilator within windows of different width, for strips may be cut from the sides 8ª of the ventilator to enable the ventilator to snugly fit within the window frame. The dotted lines in Fig. 2 are intended to show the initial formation of the ventilator and the full lines the portion that would be fitted into the window 6 shown in Fig. 1 after the dotted line portions had been severed from the ventilator.

In installing my ventilator, the upper guide strip 11 as well as the side guide strips 12 and garnish strips 13 are removed from their usual position upon the window frame after the window has been lowered. The ventilator is then cut to the desired length and is then positioned with its side portions and upper surface of the flange 10 engaging the sides and top of the window frame respectively. If desired, some securing means may be utilized to press the flange 10 into firm engagement with the top of the window frame. Usually, however, the guide strips 11 and 12 are reinserted and then the same nails or screws ordinarily utilized for securing them in place are again applied so that they also hold the ventilator in position. In either case sufficient force is exerted upon the flange 10 to force its entire upper surface to contact the top of the window frame. This tends to force the body portion of the ventilator outwardly from the window pane 14 and into engagement with the side strips 15 of the window frame. As above explained, the side strips 15 are usually vertical and accordingly those portions of the ventilator that engage such side strips 15 cannot incline outwardly, but are held by the resiliency of the ventilator in firm engagement with the side strips 15 so as to resist a tendency to rattle or vibrate independently of the vehicle body. That portion of the ventilator between the side strips 15 is free to move outwardly and accordingly bows into substantially the position shown in Fig. 4.

In Fig. 7 I have illustrated an arrangement wherein the garnish strip 16 is formed integrally with a channel flange 17 adapted to receive the top guide strip 18 against which the upper edge of the window abuts. With this construction my ventilator is inserted just as in the previously described embodiment after the garnish strip 16 has been removed, whereupon the upper and outer surfaces of the channeled flange 17 are brought into engagement with the ventilator and held in clamping relation thereto by means of the screws 19 ordinarily used for positioning the garnish strip. With this construction the desired amount of force can readily be applied to forcing the entire upper surface of the flange 10 of the ventilator into engagement with the top of the window frame.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:
1. The combination with a window frame having a substantially horizontal upper portion and substantially vertical outer guide portions for the pane exteriorly of and at the sides of the top portion, the angle between said horizontal upper portion and vertical guide portions being not greater than ninety degrees of a ventilator comprising a perforated body portion having a centrally arranged securing flange bent at an angle to the body portion greater than ninety degrees and side portions arranged at each end of the flange, whereby when the surface of the securing flange is brought into abutting engagement with the horizontal top portion of the window frame the body portion will be forced outwardly to bring the side portions of the ventilator into engagement with the vertical guide portions of the window frame to prevent rattling of the ventilator.

2. The combination with a window frame having a substantially horizontal upper portion and substantially vertical outer guide portions for the pane exteriorly of and at the sides of the top portion, the angle between said horizontal upper portion and vertical guide portions being not greater than ninety degrees of a ventilator comprising a perforated body portion having a centrally arranged securing flange at its upper extremity, a central reinforcing flange at its lower extremity, and unstiffened portions at each end of said flanges, said securing flange being arranged at an angle to the body portion greater than a right angle whereby the arrangement of the surface of the securing flange in abutting engagement with the horizontal top portion of the window frame will tilt the body portion away from the window pane and bring the side portions of the ventilator into firm engagement with the vertical guide portions of the window frame to prevent rattling, and means for fastening the securing flange to the top portion of the window frame.

3. The combination with a vehicle window frame having a substantially horizontal top portion with a depending vertical flange and substantially vertical side portions, of a ventilator for vehicle windows comprising a perforated body portion having a securing flange at its upper extremity and a reinforcing flange at its lower extremity, said flanges terminating inwardly of the ends of the body portion, whereby unstiffened side portions are provided at the sides of the body portion overlapping and abutting against the vertical side portions of the frame, said securing flange being initially arranged at an angle to the central body portion greater than the included angle of the recess between the depending flange and horizontal top portion of the window frame, whereby when the securing flange of the ventilator is secured to the top portion of the window frame with the upper surface of the securing flange and the forward surface of the central body portion abutting said flange and top portion of the window frame the central portion of the ventilator will be distorted out of its initial position relatively to the securing flange.

4. The combination with a vehicle window frame having a substantially horizontal top portion with a depending vertical flange and substantially vertical side portions, of a ventilator for vehicle windows comprising a body portion having a central perforated portion with a securing flange at its upper extremity and unstiffened portions at the sides of the body portion overlapping and abutting against the vertical side portions of the frame, said securing flange being initially arranged at an angle to the central body portion greater than the included angle of the recess between the depending flange and horizontal top portion of the window frame, whereby when the securing flange of the ventilator is secured to the top portion of the window frame with the upper surface of the securing flange and the forward surface of the central body portion abutting said flange and top portion of the window frame the central portion of the ventilator will be distorted out of its initial position relatively to the securing flange.

In witness whereof I hereunto set my hand.

JOHN H. PARSONS.